June 6, 1939.  H. M. BIELE  2,161,004
PHOTOGRAPHIC DEVICE
Filed March 7, 1936
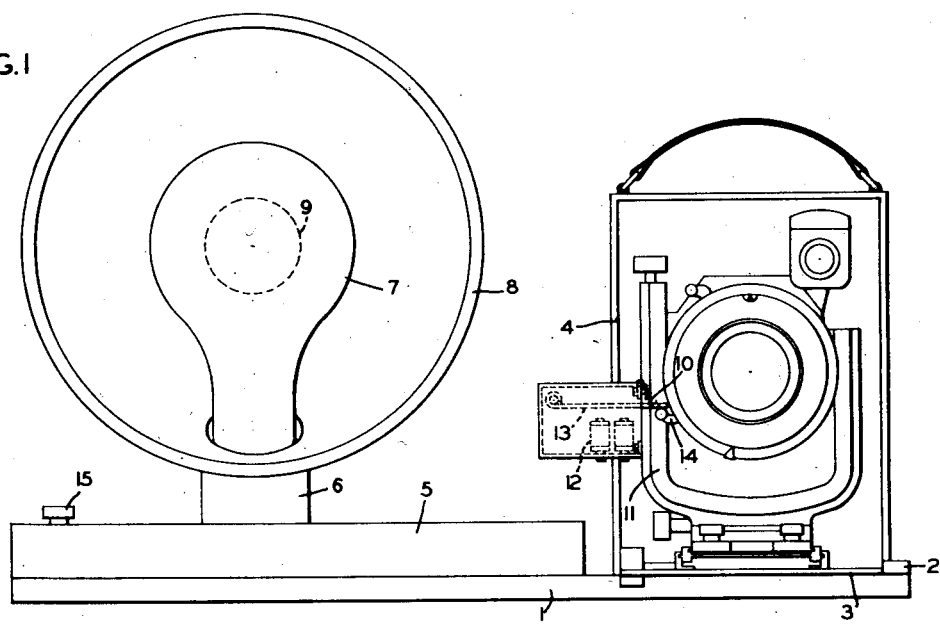
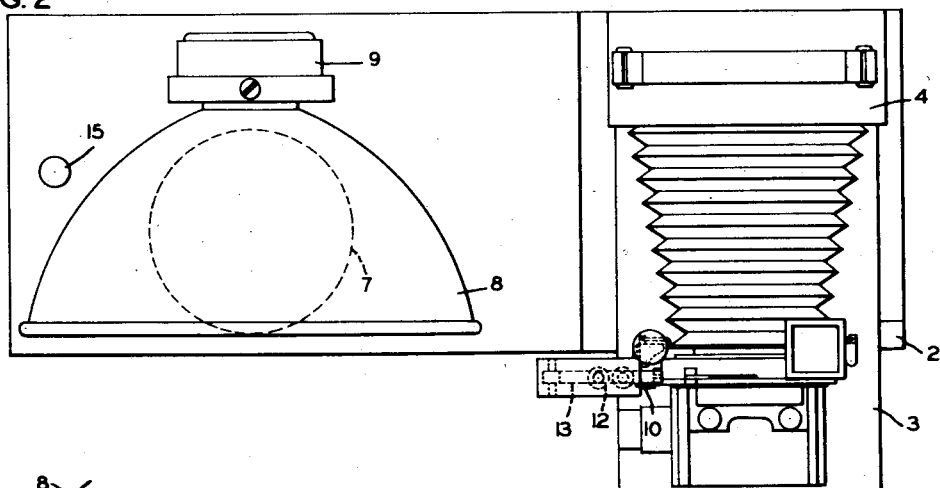
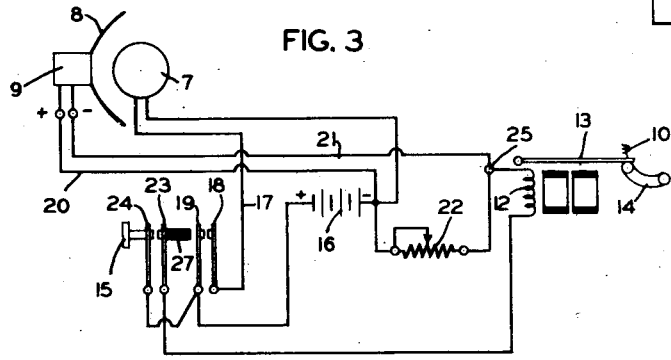
INVENTOR
Harry M. Biele
BY James N. Curtin
ATTORNEY Patented June 6, 1939

2,161,004

UNITED STATES PATENT OFFICE 2,161,004

PHOTOGRAPHIC DEVICE

Harry M. Biele, Hollis, N. Y.

Application March 7, 1936, Serial No. 67,697

6 Claims. (Cl. 67—29)

This invention relates to photography and has for its object to provide an improved apparatus for synchronizing a camera shutter with a photo flash lamp.

Another object is to provide an efficient circuit arrangement which reduces the drain on the battery and eliminates the possibility of premature operation of the device.

Due to the lack of uniformity in operating time of flash bulbs that are now commercially available, difficulty is experienced in securing good exposures with known synchronizing devices, accordingly the present invention contemplates the use of a flash lamp located in close proximity to a light sensitive cell in order that the latter may time the operation of the camera shutter.

The invention will now be described with the aid of the accompanying drawing of which there is but one sheet.

Figure 1 is a front elevation showing a camera having a shutter of the well-known Compur type, together with a flash lamp apparatus for controlling the same, according to the present invention.

Figure 2 is a plan view of the device.

Figure 3 is a wiring diagram.

In a preferred form, suitable for newspaper work, the invention is shown in the drawing as having a base 1 with a member 2 secured thereto for the purpose of locating the base 3 of a camera 4. The camera may be secured to base 1 by means of a suitable clamp, or by a thumb screw, not shown, which passes through base 1 and screws into the usual tripod thread in the camera base. A box or receptacle 5 for a battery is also secured to base 1.

Mounted on top of box 5 is a lamp socket 6 for flash lamp 7. The lamp socket supports reflector 8 provided with an opening in its center in which is mounted a light sensitive cell 9. There are a number of suitable light sensitive cells on the market and applicant has found that the Weston Photronic cell which generates a certain amount of current, according to light intensity, to be suitable for use in connection with his invention.

The fork 11 of camera 4 has a small electromagnet 12 secured to it in such a way that the armature 13 thereof will depress the camera shutter lever 14 when the magnet is sufficiently energized. A light spring 10, which is preferably adjustable, is provided for restoring armature 13.

A contact operating button 15 projecting upwards from box 5 controls the operating circuits of the invention which are shown in detail in Figure 3.

Referring now to Figure 3: Flash bulb 7 is shown with one terminal permanently connected to the negative terminal of battery 16 while the other side of the lamp is connected through circuit 17 to contact spring 18 which cooperates with a similar spring 19, the latter being connected to the positive side of battery 16. Conductor 20 connects a terminal of the photoelectric cell with the negative terminal of battery 16. Another conductor 21, from the cell is connected to one terminal of the windings of shutter magnet 12, the opposite terminal of which is connected to a contact member 23 which cooperates with a similar contact member 24, the latter being permanently connected to the positive side of battery 16.

An adjustable resistance 22 is connected between one terminal 25 of shutter magnet 12 and the negative side of battery 16.

Operation

Contacts 18, 19, 23 and 24 are preferably assembled in a single unit, so mounted in the box that button 15 first closes 23 and 24, the former being provided with a lug of insulating material 27, which in turn engages contact 19 causing it to make with contact 18 after 23 and 24 have closed.

It will be seen from Figure 3 that all battery circuits are normally open, consequently there is no drain on the battery except during the momentary operation of the device, furthermore there is no danger of an accidental operation of the device unless button 15 is pressed.

When it is desired to make an exposure, assuming that the usual preliminary adjustments of the camera have been made, button 15 is pressed, closing first contacts 23 and 24, and then contacts 18 and 19.

When contacts 23 and 24 make, a circuit is completed from the negative side of battery 16, through resistance 22, shutter magnet 12, contacts 23 and 24, to the positive side of the battery. Photoelectric cell 9 is shunted across resistance 22. Under normal light conditions, the photoelectric cell has an extremely high resistance, and the resistance is adjusted so that the amount of current flowing through the windings of shutter magnet 12, with no bulb in the socket, or with only contacts 23 and 24 closed, is not quite sufficient to cause the operation of the shutter magnet without the aid of the flash bulb.

When contacts 18 and 19 close, however, a circuit is completed from the positive side of battery 16, through the photo flash bulb, causing the bulb to ignite, and the intense light therefrom falling on the photoelectric cell greatly reduces the resistance thereof permitting an impulse of current to flow through the windings of shutter magnet 12 causing its armature 13 to operate shutter lever 14.

The operating time of shutter magnet 12 can be controlled by adjusting the resistance, and also the shutter magnet armature, so that the camera may be made to operate at almost any part of the light curve of bulb 7. It is thought unnecessary to give detailed description of the characteristics of the relays or the circuits, since these will vary somewhat with the kind of light sensitive cell used. The Weston Photronic cell was found to be a satisfactory light sensitive device, and was used in connection with a four and one-half volt battery which supplied the potential for the various circuits. With the arrangement just described, once the device was adjusted, many perfectly uniform exposures were made at shutter speeds as high as one two hundredth of a second, the maximum speed of the shutter employed, under circumstances which would render ordinary flash light photography extremely difficult, if not impossible.

What is claimed is:

1. In a device of the character described, a photo flash lamp, a reflector therefor, a light sensitive cell mounted in said reflector, a source of potential, circuits connected therewith including two pairs of normally open contacts, a push button for operating said contacts in succession, a shutter magnet included in one of said circuits, the circuit arrangement being such that the first pair of said contacts to close serves to establish a circuit from said source of potential through said cell and said shutter magnet, partially energizing said magnet, and the second pair of contacts when closed serving to operate said photo flash lamp, thus illuminating said cell and thereby reducing the resistance thereof sufficiently to permit sufficient current to flow through the shutter magnet to cause the operation thereof.

2. In a device of the character described, a photo flash lamp, a reflector therefor, a photo electric cell, a source of potential, circuits connected therewith including two pairs of normally open contacts, a push button for operating said contact pairs in succession, a shutter magnet included in one of said circuits, an adjustable resistance shunted across said cell, the circuit arrangement being such that when the first pair of contacts is closed a circuit is established from the source of potential through the photo electric cell, resistance and shutter magnet, partially energizing said magnet, and when the second pair of contacts is closed operating potential is applied to the flash lamp, thus illuminating said cell and thereby reducing the resistance thereof sufficiently to permit sufficient current to flow through the shutter magnet to cause the operation thereof.

3. Apparatus for flash-light photography comprising a camera shutter, electrically controlled means for actuating said shutter, light flash-producing means, a light-sensitive cell responsive to light generated by said flash-producing means, an electric circuit including a source of electrical energy and said shutter actuating means and light-sensitive cell and a resistance, said resistance and light-sensitive cell being connected in multiple, the current flow through said resistance being insufficient to actuate said shutter, said light-sensitive cell causing an increased current flow to actuate said shutter when light from said flash-producing means strikes the said cell.

4. Apparatus for flash-light photography comprising a camera shutter, electrically controlled means for actuating said shutter, light flash-producing means, a light-sensitive cell responsive to light generated by said flash-producing means, an electric circuit including a source of electrical energy and said shutter actuating means and light-sensitive cell and a variable resistance, said resistance and light-sensitive cell being connected in multiple whereby the said variable resistance may be adjusted so that the current flow therethrough is just insufficient to actuate said shutter, said light-sensitive cell causing an increased current flow to actuate said shutter when light from said flash producing means strikes the said cell.

5. Apparatus for flash-light photography comprising a camera shutter, a solenoid for actuating said shutter, light flash-producing means, a light-sensitive cell responsive to light generated by said flash-producing means, a source of electric current, means to connect said light-sensitive cell and the coil of said solenoid in series across the terminals of said current source, and a resistance connected in multiple with said light-sensitive cell, the current flow through said resistance being insufficient to actuate said shutter, said light-sensitive cell causing an increased current flow to actuate said shutter when light from said flash-producing means strikes the said cell.

6. In an apparatus for flash-light photography, the combination comprising a camera shutter, an electromagnetic shutter motor, light-flash-producing means, a light sensitive cell positioned to receive light from said means, a circuit including a current source, and control means, when actuated, for sequentially connecting said electromagnetic shutter motor to said circuit to partially energize it and connect said light-flash-producing means to said circuit to operate it, the operation of the light-flash-producing means causing the light sensitive cell to complete the energization of said shutter motor to operate said shutter.

HARRY M. BIELE.